United States Patent [19]

Ippen et al.

[11] 4,051,883
[45] Oct. 4, 1977

[54] PUNCTURE-PROOF TIRES

[75] Inventors: Jakob Ippen, Leverkusen-Steinbuechel; Friedel Stüttgen, Cologne, both of Germany

[73] Assignee: Bayer Aktiengesellschaft, Leverkusen, Germany

[21] Appl. No.: 640,719

[22] Filed: Dec. 15, 1975

[30] Foreign Application Priority Data

Dec. 19, 1974 Germany .............................. 2460051

[51] Int. Cl.² .............................................. B60C 7/08
[52] U.S. Cl. ...................................... 152/324; 152/301
[58] Field of Search ................ 152/300, 301, 304–308, 152/323–329, 310

[56] References Cited

U.S. PATENT DOCUMENTS

| | | | |
|---|---|---|---|
| 1,414,252 | 4/1922 | Brubaker | 152/324 |
| 1,597,381 | 8/1926 | Lambert | 152/324 |
| 2,603,267 | 7/1952 | Simpson | 152/324 |
| 3,866,652 | 2/1975 | Ahmad | 152/310 |

Primary Examiner—Drayton E. Hoffman
Attorney, Agent, or Firm—Connolly and Hutz

[57] ABSTRACT

A puncture-proof vehicle tire mounted on a multi-part felly, wherein the tire foot and the tread are connected by cushioning axial and radial reinforcing parts, formed by axial cut-outs which are staggered in relation to one another and are optionally subdivided by crosspieces. The cut-outs are preferably arranged in such a way that the tire consists of opposed segments, wherein the tire foot and the tread are connected by an optionally asymmetrical cushioning section, which is oriented alternately in the consecutive segments towards one felly edge or the other.

3 Claims, 7 Drawing Figures

PUNCTURE-PROOF TIRES

The present invention relates to vehicle tires. The load bearing element of pneumatic vehicle tires is the carcass. This is basically a hollow body in the form of a torus of vulcanised rubber containing reinforcing elements (textile or steel cord filaments) which are capable of withstanding tensile stress. The hollow body is filled with air under pressure and its walls are under tensile stress. The weight of the vehicle counteracts this tension and partially compensates it. If such a tire ceases to be airtight and loses its internal pressure, then the compression caused by the weight of the vehicle predominates, the tire loses its shape and is quickly destroyed by the rolling motion.

Solid tires which do not contain compressed air as a cushioning element (solid rubber tires) do not suffer from this disadvantage. But to achieve this their mass is very large. In the course of the rolling motion accumulation of heat occurs leading to the destruction of the tire material.

The object of the invention is to provide a tire which does not have a hollow space filled with compressed air and which has a sufficiently small mass that no heat accumulates. Such a tire is puncture-proof.

This object is achieved by providing air channels by means of axial cut-outs which greatly reduce the mass of the tire, thus achieving adequate cooling during running. By the logical arrangement of the cut-outs, reinforcing segments are formed between the tread of the tire and the tire foot which stabilise the tire sufficiently and afford it the necessary cushioning properties. For this purpose, the symmetrically constructed tire is mounted on a divided felly.

According to the invention there is provided a vehicle tire comprising an outer tread surface, a foot adapted to contact a wheel felly and a resilient connecting portion connecting the tread surface and the foot, the connecting portion comprising a plurality of radially spaced supporting members, consecutive supporting members being arranged on opposite sides of the centre of the tire.

Novel features and advantages of the present invention will become apparent to one skilled in the art from a reading of the following description in conjunction with the accompanying drawings wherein similar reference characters refer to similar parts and in which.

Figure 1:
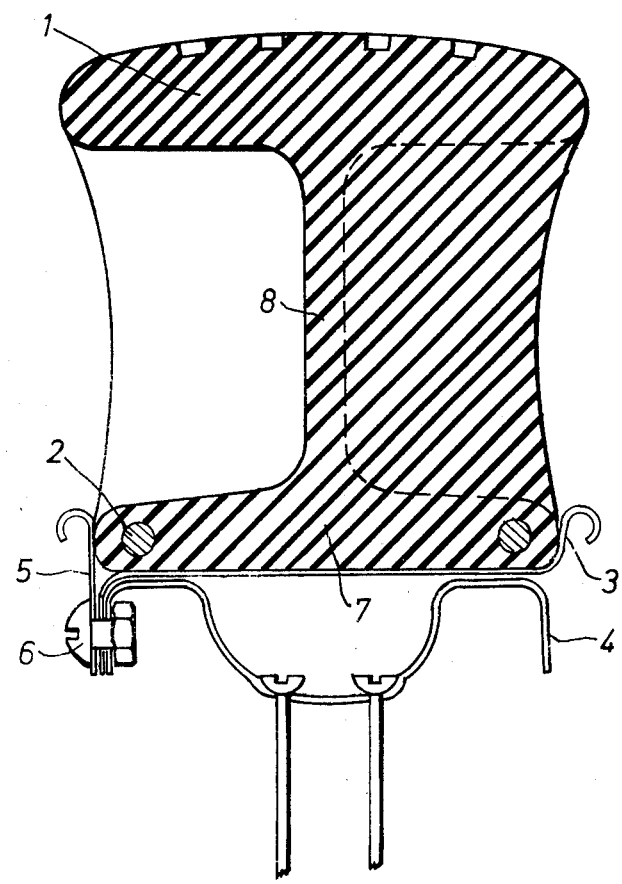
FIG. 1 is a cross-sectional view taken through FIG. 2 along the line 1—1.

FIG. 1 is a cross section through such a tire mounted on a multi-part felly 3,4,5,6. The form and arrangement of the cut-outs which are staggered in relation to one another, axial, opposite and optionally subdivided by crosspieces, connect the positively curved thread 1 with the tire foot 7 which is reinforced by two wire cores 2 by cushioning axial and radial reinforcing pieces 8.

Figure 2:
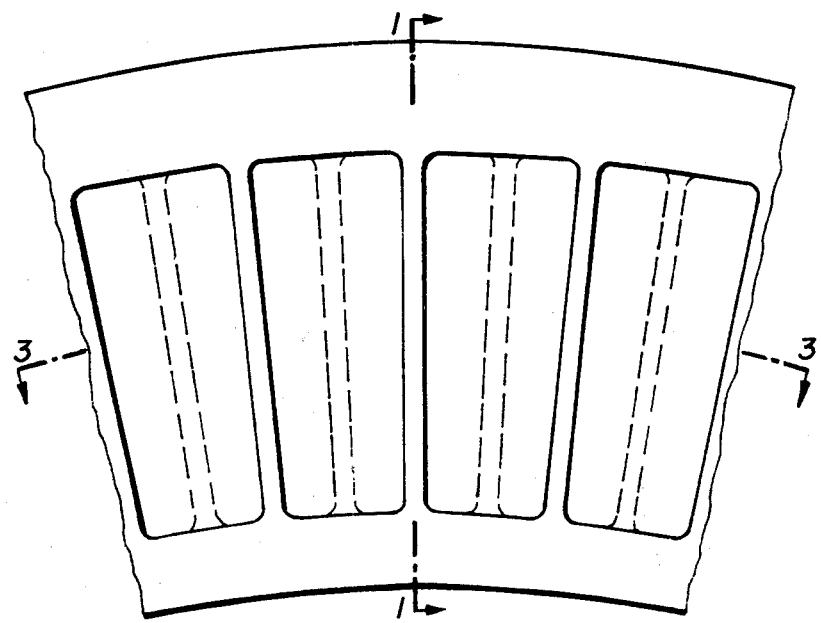
FIG. 2 is a partial side view in elevation of a tire which is one embodiment of this invention.
Figure 3:
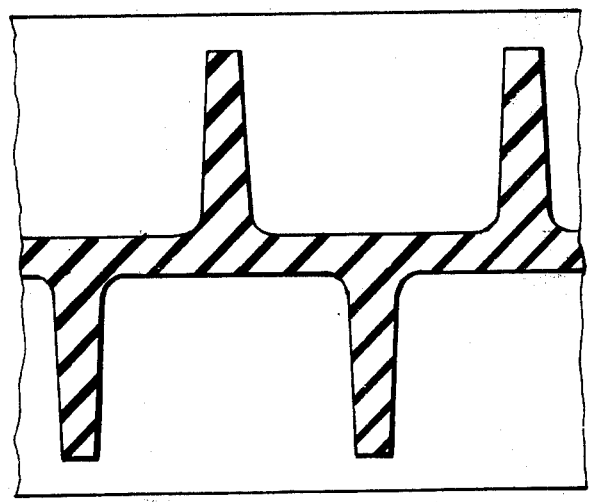
FIG. 3 is a cross-sectional view taken through FIG. 2 along the line 3—3.

FIG. 2, is a portion of the side view of the tire, and FIG. 3, is an axial section through the tire, showing the U-shaped, staggered connecting pieces 8 which represent the actual cushioning element and give rise to the stability of the tire.

Figure 4:
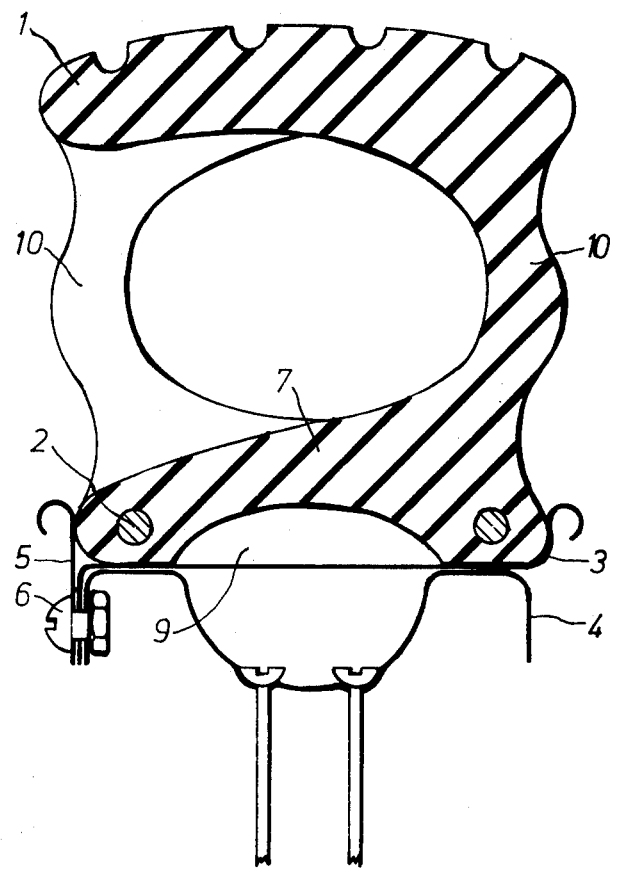
FIG. 4 is a cross-sectional view taken through FIG. 5 along the line 4—4.

FIG. 4 is a cross-section through a preferred form of the tire of the present invention. The axial cut-outs for the reduction of tire-mass are so arranged that a symmetrically constructed tire, composed of segments staggered in relation to one another, is formed. The individual segments consist of the positively curved tire tread 1, the tire foot 7, reinforced by two wire cores 2 and optionally provided with an indentation 9, and a cushioning optionally asymmetrical connecting piece 10 which is oriented alternately to one or other felly rim.

Figure 5:
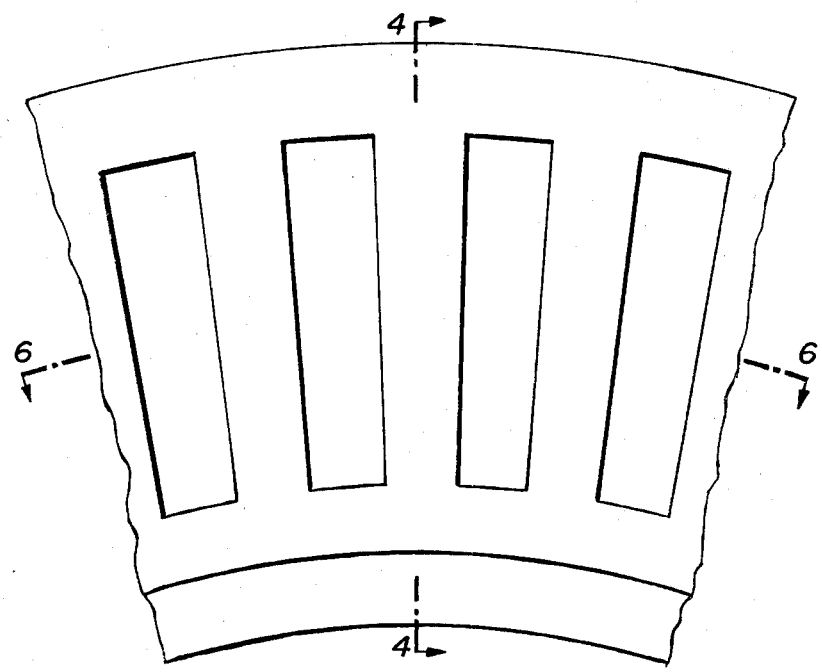
FIG. 5 is a partial view in elevation of a portion of a tire which is another embodiment of this invention.
Figure 6:
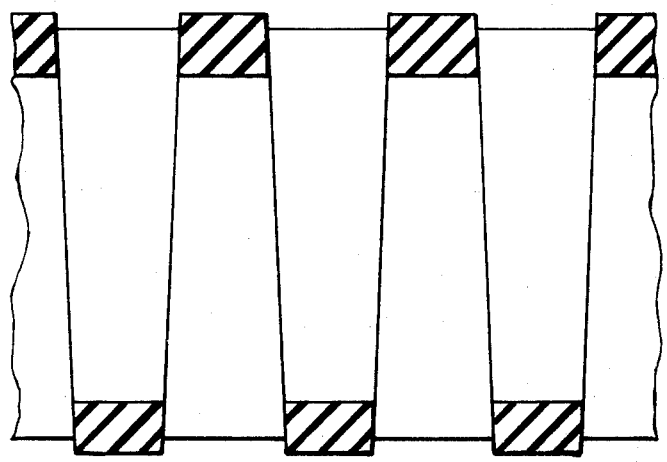
FIG. 6 is a cross-sectional view taken through FIG. 5 along the line 6—6.

FIG. 5 represents a portion of the side view of the preferred form of the tire and FIG. 6 an axial section through this tire.

The invention thus relates to a symmetrical, puncture-proof tire mounted on a multi-part felly 3,4,5,6 which consists either of opposed segments made up of a positively curved tread 1, a foot 7, and a cushioning, optionally asymmetrical connecting piece 10, or which by the appropriate arrangement of axial cut-outs between the tread 1 and the foot 7 contains cushioning reinforcing pieces 8 optionally connected by a crosspiece, whereby the tire foot, optionally provided with an indentation 9 is held on the felly by two reinforcing wire cores 2 and the outer felly rim.

The height/width ratio of the tire may be from 0.45 to 1.25, preferably from 0.9 to 1.1.

The tires of the invention may be manufactured from any natural or synthetic rubber whose vulcanisates have a Shore A hardness of 55 to 90 and a tension value of 110 to 200 kp/cm$^2$ at 300% elongation. Natural rubber, styrene/butadiene rubber, polybutadiene and ethylene propylene terpolymerisate rubber are particularly suitable.

The weight of the tire is only approximately 25–30% above that of comparable pneumatic tires. The properties of the tires can be influenced inter alia by the number of reinforcing pieces or segments. In general, each tire has from 20 to 100 and preferably from 40 to 80 segments.

The tires of the invention can be manufactured as simple injection products by means of the transfer process. This requires one operation only. Apart from the two wire rings in the tire foot, no reinforcing elements are necessary.

EXAMPLE

Figure 7:
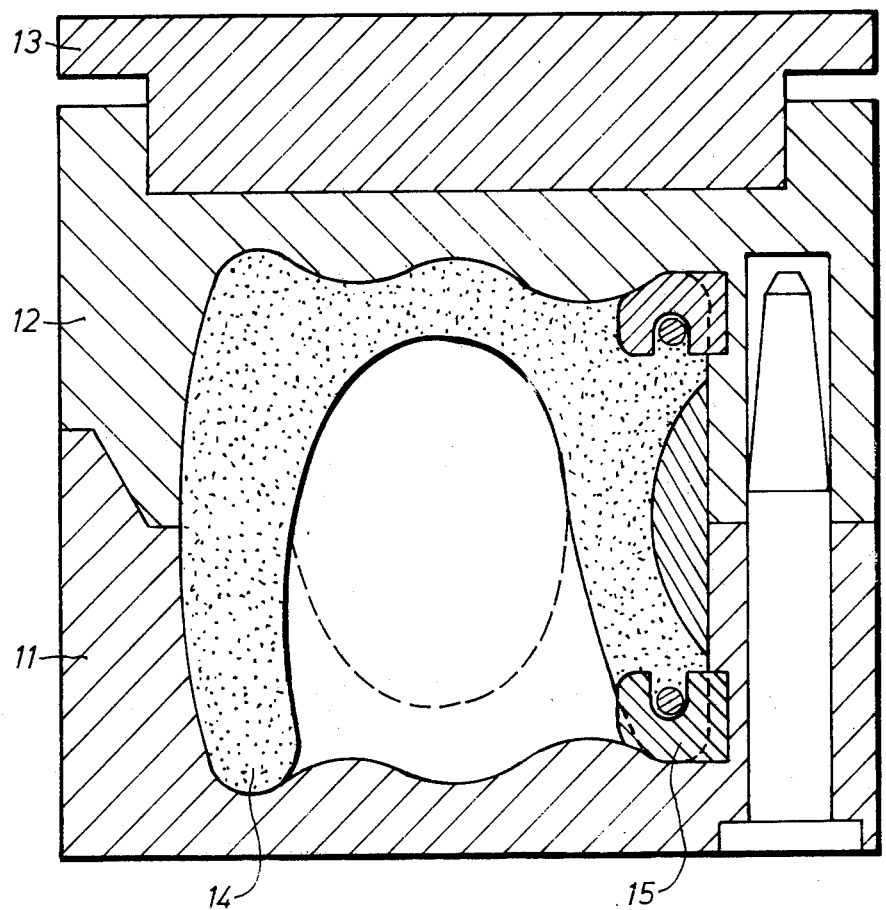
FIG. 7 is a cross-sectional view taken through a mold in which a tire, which is a further embodiment of this invention, is being manufactured.

A tire is manufactured in a toroidal transfer mold. A section through this mold is shown in FIG. 7. 11 is the lower mold half, 12 is the upper mold half, 13 is the pressure piston, 14 the inside of the mold, 15 a rib arrangement for securing the wire rings.

First the wire rings are placed into the upper and lower mold halves and secured by means of the rib arrangement. A vulcanisable rubber mixture is poured into the upper mold half, the mold is closed and subjected to pressure by means of the piston 13 (approx. 100 kg/cm$^2$). The mold is then heated for 2–12 minutes at 145°–175° C. After that the tire can be removed. The wire cores in the tire foot consist of solid, copper-plated steel wire. They are not - as they are in pneumatic tires - stressed for bending. The tire has 60 segments.

The tires are produced with the following rubber compounds:

| | |
|---|---|
| Natural rubber | 25.0 |
| Styrene/butadiene copolymer | 25.0 |
| cis-1.4-polybutadiene | 50.0 |
| Carbon black N-330 | 80.0 |
| Resin | 4.0 |
| Stearic acid | 2.0 |
| N-isopropyl-N'-phenyl-p-phenylenediamine | 2.5 |
| 2.2.4-trimethyl-1.2-dihydrochinoline, polymerised | 1.5 |
| Zinc oxide | 5.0 |
| Benzothiacyl-2-cyclohexylsulphene amide | 1.2 |
| Insoluble sulphur | 2.66 |
| | 198.86 |
| Mixing plasticity / 80° C | |
| Defo hardness/Defo elasticity | 7700/17 |
| Tensile strength (kp/cm$^2$) | 199 |
| Breaking elongation (%) | 310 |
| Tension at 300% elongation (kp/cm$^2$) | 191 |
| Tear propagation resistance according to Pohle kp/4mm) | 16 |
| Hardness (Shore A) at 20° C | 82 |
| Natural rubber | 80.0 |
| cis-1.4-polybutadiene | 20.0 |
| Carbon black N-330 | 55.0 |
| Aromatic mineral oil | 3.0 |
| Stearic acid | 2.5 |
| Ozone protective wax | 1.0 |
| N-isopropyl-N'-phenyl-p-phenyldiamine | 2.5 |
| 2.2.4-trimethyl-1.2-dihydrochinoline, polymerised | 1.5 |
| Zinc oxide | 5.0 |
| Benzothiacyl-2-sulphene morpholide | 1.2 |
| Insoluble sulphur | 1.9 |
| | 173.6 |
| Mixing plasticity/80° C | |
| Defo-hardness/Defo elasticity | 1100/15 |
| Tensile strength (kp/cm$^2$) | 219 |
| Breaking elongation (%) | 460 |
| Tension at 300% elongation (kp/cm$^2$) | 130 |
| Tear propagation resistance according to Pohle (kp/4mm) | 37 |
| Hardness (Shore A) at 20° C | 66 |
| Oil-extended styrene-butadiene-copolymer | 68.5 |
| Oil-extended cis-1.4-polybutadiene | 68.5 |
| Carbon black N-220 | 95.0 |
| Aromatic mineral oil | 20.0 |
| Resin | 2.0 |
| Stearic acid | 2.0 |

-continued

| | |
|---|---|
| Ozone protective wax | 1.5 |
| N-isopropyl-N'-phenyl-p-phenylenediamine | 2.5 |
| 2.2.4-trimethyl-1.2-dihydrochinoline, polymerised | 1.5 |
| Zinc oxide | 3.0 |
| Benzothiacyl-2-cyclohexylsulphenamide | 1.5 |
| Tetramethylthiuramic monosulphide | 0.2 |
| Insoluble sulphur | 2.4 |
| | 268.6 |
| Mixing plasticity / 80° C | |
| Defo hardness/Defo elasticity | 1550/16 |
| Tensile strength (kp/cm$^2$) | 155 |
| Breaking elongation (%) | 410 |
| Tension at 300% elongation (kp/cm$^2$) | 108 |
| Tear propagation resistance according to Pohle (kp/4mm) | 24 |
| Hardness (Shore A) at 20° C | 66 |

What we claim is:

1. A vehicle tire comprising an outer tread element, a foot adapted to contact a wheel felly, the foot having two peripherally-disposed outer portions, a resilient connecting portion connecting the tread element and the foot, the connecting portion comprising a plurality of radially and evenly spaced supporting members, consecutive supporting members being arranged on opposite sides of the center of the tire, the foot comprises two unstressed reinforcing circular wire cores disposed within the two outer portions of the foot, the tire comprises a plurality of segments alternately arranged in opposite directions, each segment comprising a portion of the tread, a supporting member and a portion of the foot, the segments having concavely curved inner walls and convexly curved outer walls, the foot has an indentation of the inner side thereof, the indentation extending around the entire circumference of the tire.

2. A tire as claimed in claim 4, wherein the height : width ratio is from 0.45 to 1.25.

3. A tire as claimed in claim 2, wherein the height : width ratio is from 0.9 to 1.1.

* * * * *